(12) United States Patent
Takeshima

(10) Patent No.: US 10,867,369 B2
(45) Date of Patent: Dec. 15, 2020

(54) IMAGE DATA RESTORATION APPARATUS AND IMAGE DATA RESTORATION METHOD

(71) Applicant: Canon Medical Systems Corporation, Otawara (JP)

(72) Inventor: Hidenori Takeshima, Ebina (JP)

(73) Assignee: Canon Medical Systems Corporation, Otawara (JP)

(*) Notice: Subject to any disclaimer, the term of this patent is extended or adjusted under 35 U.S.C. 154(b) by 181 days.

(21) Appl. No.: 16/032,334

(22) Filed: Jul. 11, 2018

(65) Prior Publication Data
US 2019/0026866 A1    Jan. 24, 2019

(30) Foreign Application Priority Data
Jul. 21, 2017 (JP) ................. 2017-142037

(51) Int. Cl.
G06T 5/00 (2006.01)
G06T 11/00 (2006.01)
G06T 5/50 (2006.01)

(52) U.S. Cl.
CPC ............... G06T 5/001 (2013.01); G06T 5/50 (2013.01); G06T 11/003 (2013.01); *G06T 2207/10036* (2013.01); *G06T 2207/10081* (2013.01); *G06T 2207/10088* (2013.01); *G06T 2207/10116* (2013.01)

(58) Field of Classification Search
None
See application file for complete search history.

(56) References Cited

U.S. PATENT DOCUMENTS 6,169,817 B1 * 1/2001 Parker ................. G06T 7/11
                                             382/131
6,680,610 B1 * 1/2004 Kyriakos ............ G01R 33/5611
                                             324/307

(Continued)

FOREIGN PATENT DOCUMENTS

JP       2019-5289 A       1/2019
WO    WO 2017/029702 A1    2/2017

OTHER PUBLICATIONS

Feng, L., et al., "XD-GRASP: Golden-Angle Radial MRI with Reconstruction of Extra Motion-State Dimensions Using Compressed Sensing", Magnetic Resonance in Medicine, vol. 75, pp. 14, 2016.

*Primary Examiner* — Mohammed Rachedine
(74) *Attorney, Agent, or Firm* — Oblon, McClelland, Maier & Neustadt, L.L.P.

(57) ABSTRACT

According to one embodiment, an image data restoration apparatus includes processing circuitry. The processing circuitry acquires a plurality of items of observation data respectively corresponding to a plurality of channels used in a computation; and iteratively executes a computation to optimize a fitting score between first observation data corresponding to a first channel subset and first intermediate image data based on the first observation data, and executes, after the iterative computation satisfies a predetermined condition, a computation to optimize a fitting score between second observation data corresponding to a second channel subset and second intermediate image data based on the second observation data to generate restored image data and outputs the restored image data.

15 Claims, 7 Drawing Sheets

(56) References Cited

U.S. PATENT DOCUMENTS

| | | | |
|---|---|---|---|
| 7,840,052 B2 * | 11/2010 | Zhao | ................. G06T 5/003 |
| | | | 382/131 |
| 2007/0013375 A1 | 1/2007 | Akao et al. | |
| 2007/0197911 A1 * | 8/2007 | Kaiser | ............ G01N 21/6458 |
| | | | 600/437 |
| 2011/0089949 A1 * | 4/2011 | Kyriakos | ........... G01R 33/3415 |
| | | | 324/322 |
| 2018/0182133 A1 * | 6/2018 | Tanaka | ................. G06T 11/006 |
| 2018/0372824 A1 | 12/2018 | Saito et al. | |

* cited by examiner

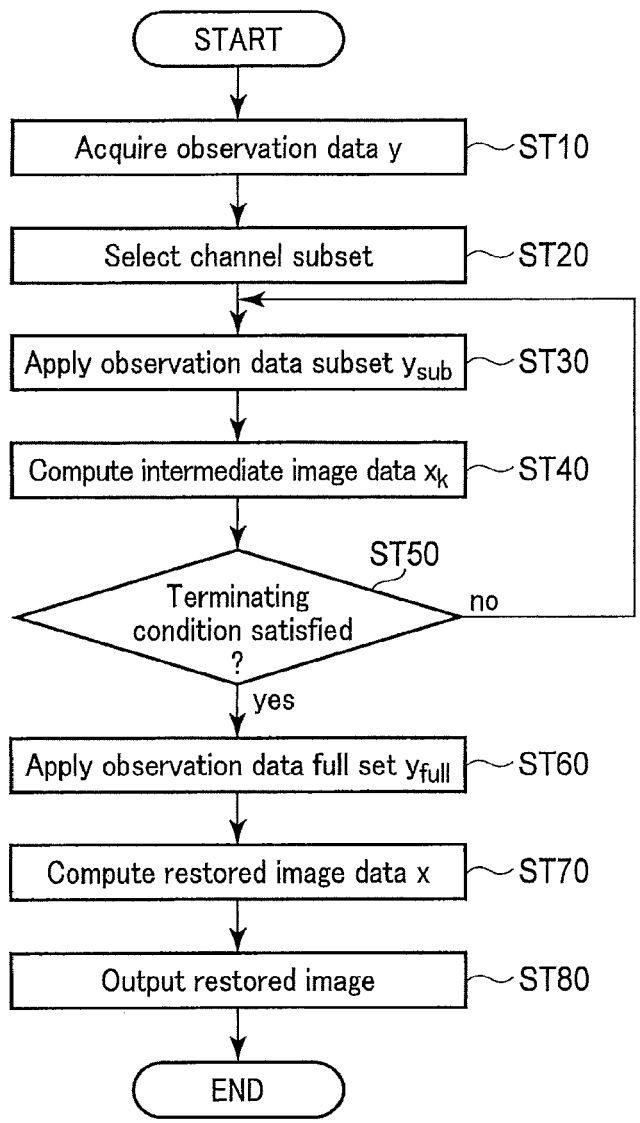
F I G. 3

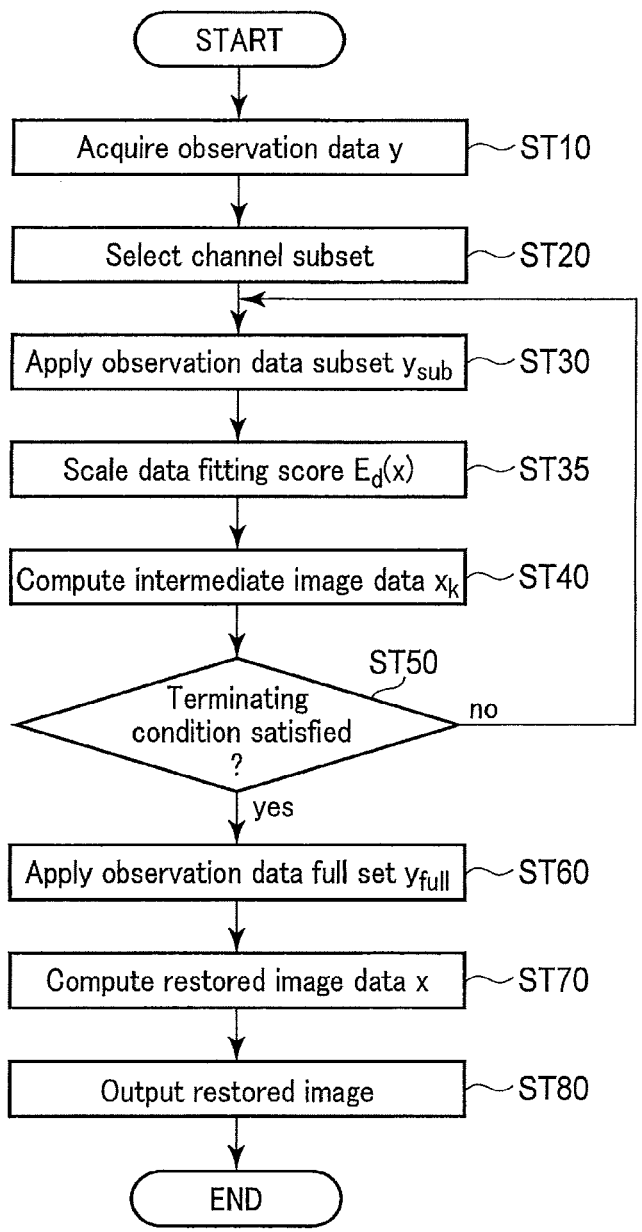
F I G. 4

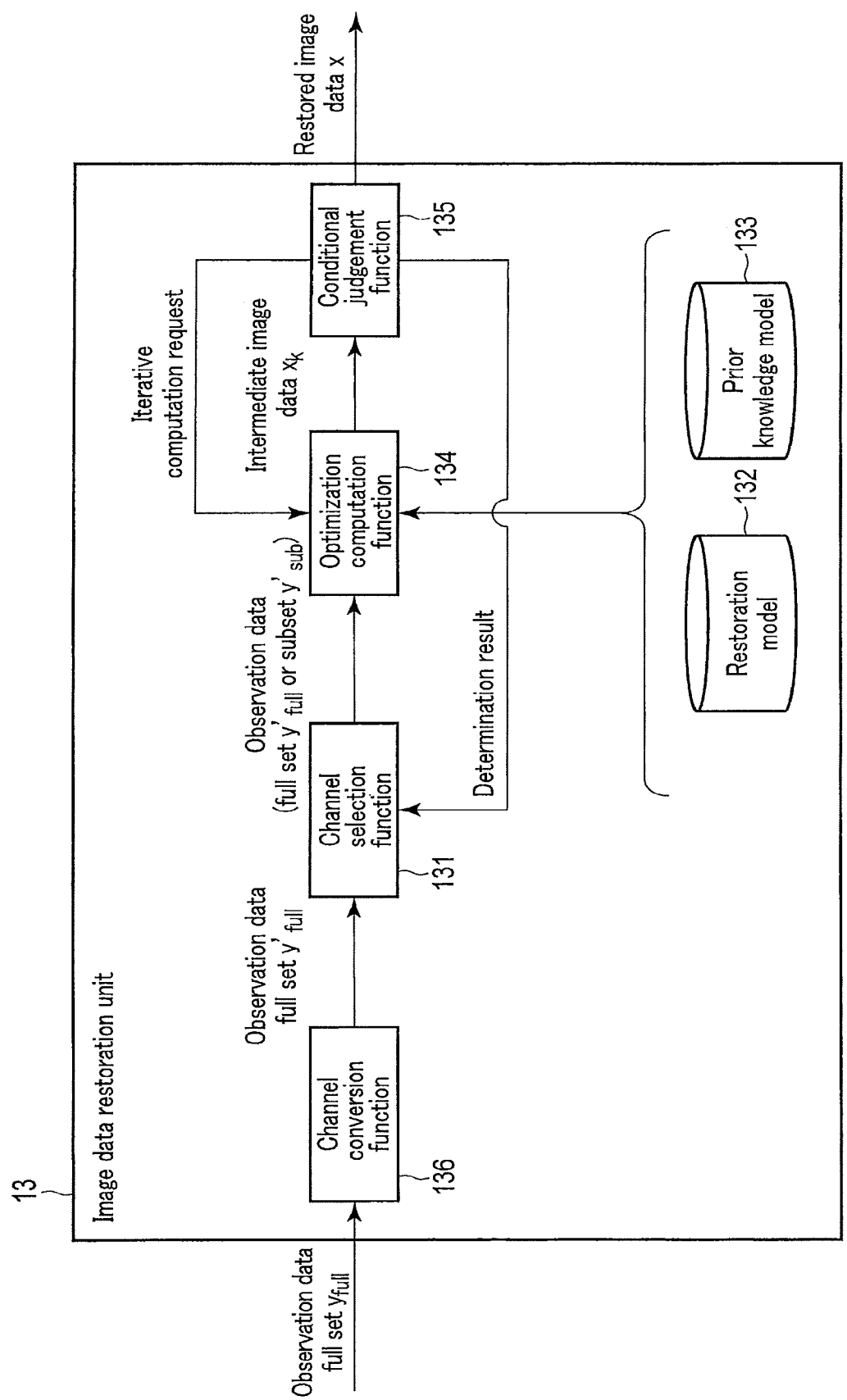
F I G. 6

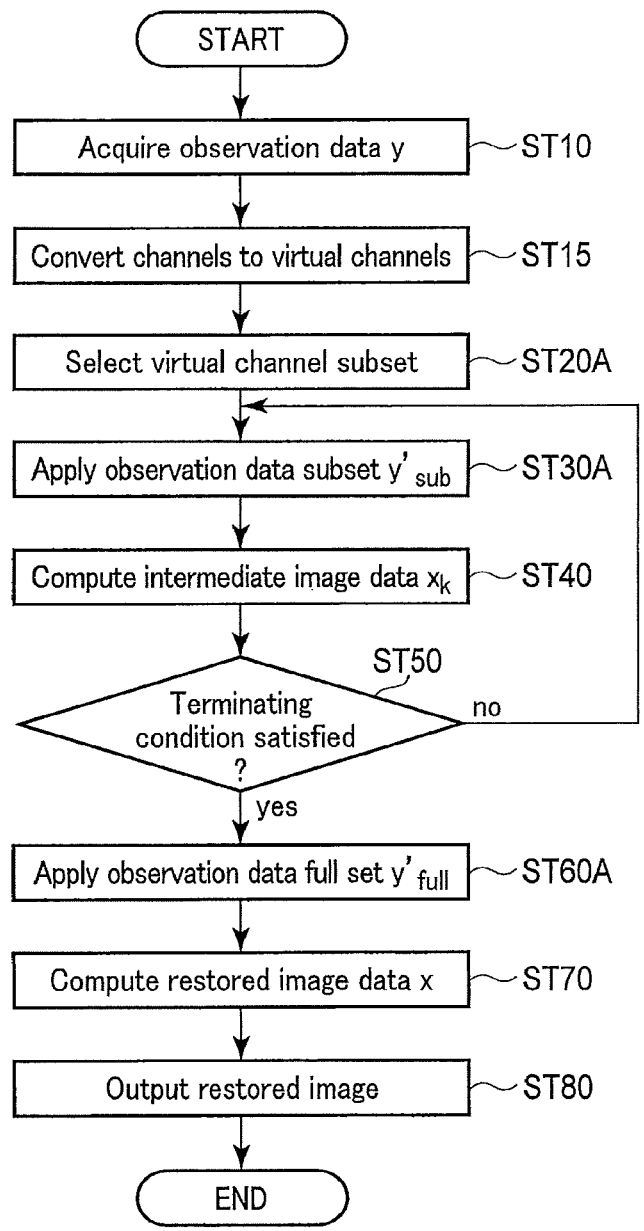
F I G. 7

IMAGE DATA RESTORATION APPARATUS AND IMAGE DATA RESTORATION METHOD

CROSS-REFERENCE TO RELATED APPLICATIONS

This application is based upon and claims the benefit of priority from Japanese Patent Application No. 2017-142037, filed Jul. 21, 2017, the entire contents of which are incorporated herein by reference.

FIELD

Embodiments described herein relate generally to an apparatus that restores image data on the basis of observation data corresponding to a plurality of channels.

BACKGROUND

An image restoration problem, which acquires observation data observed in a plurality of channels with respect to an observation target and restores image data of the observation target by utilizing the acquired observation data, occurs in various aspects of society. Examples of apparatuses for solving an image restoration problem include a multispectral camera (hyperspectral camera), a spectral X-ray apparatus employed in computed tomography (CT), X-ray nondestructive testing, etc., and a magnetic resonance imaging (MRI) apparatus.

A prior knowledge model is often used in an image restoration problem to restore image data with high accuracy. In many cases, a nonlinear model of which a closed-form solution does not exist or cannot be easily calculated is used as the prior knowledge model. Examples of the prior knowledge model include compressed sensing, the elastic net, and a low-rank constraint model. Such an image restoration problem is formulated as, for example, a noise removal problem in a multispectral camera, a reconstruction problem including the Radon transform in a spectral X-ray apparatus, and a reconstruction problem including the Fourier transform in an MRI apparatus.

Many of the image restoration problems that use a nonlinear prior knowledge model use a scheme that optimizes, by an iterative solver, a weighted sum of a fitting score with respect to collected data (data fitting score) and a fitting score with respect to a prior knowledge model (prior knowledge fitting score).

Typically, in the above-described iterative solver, image data of a target can be restored with high accuracy by using data observed in a sufficient number of channels. However, calculation of the data fitting score requires an amount of processing proportional to the number of channels. Thus, since the data fitting score and the prior knowledge fitting score need to be iteratively calculated to restore the image data, a longer time is required as the number of channels increases. On the other hand, when the number of channels is decreased, the time required to restore the image data can be reduced; however, the image quality of the restored image data will be deteriorated, compared to the case where data observed in all the channels is used.

BRIEF DESCRIPTION OF THE DRAWINGS

FIG. 3 is a flowchart illustrating an example of an image data restoration operation in the image data restoration apparatus according to the embodiment.

FIG. 4 is a flowchart illustrating an example of an image data restoration operation in an image data restoration apparatus according to a first modification of the embodiment.

FIG. 6 is a block diagram illustrating an example of a configuration of an image data restoration apparatus according to a third modification of the embodiment.

FIG. 7 is a flowchart illustrating an example of an image data restoration operation in the image data restoration apparatus according to the third modification of the embodiment.

DETAILED DESCRIPTION

According to one embodiment, an image data restoration apparatus includes processing circuitry. The processing circuitry acquires, with respect to a target, a plurality of items of observation data respectively corresponding to a plurality of channels used in a computation; selects a first channel subset and a second channel subset, the first channel subset including one or more channels of the plurality of channels, the second channel subset including, of the plurality of channels, channels larger in number than the first channel subset; and iteratively executes a computation to optimize a fitting score between first observation data corresponding to the first channel subset and first intermediate image data based on the first observation data, and executes, after the iterative computation satisfies a predetermined condition, a computation to optimize a fitting score between second observation data corresponding to the second channel subset and second intermediate image data based on the second observation data to generate restored image data and outputs the restored image data.

An embodiment will be explained with reference to the accompanying drawings. In the explanation that follows, structural elements having similar functions and configurations will be denoted by the same reference symbols.

1. EMBODIMENT

An explanation will be given of an image data restoration system according to the embodiment. The image data restoration system according to the embodiment is widely applicable to, for example, systems that remove noise in an image in a multispectral camera, reconstruct an image in a spectral X-ray apparatus, and reconstruct an image in an MRI apparatus.

1.1 Configuration

1.1.1 Configuration of Image Data Restoration System

A configuration of an image data restoration system according to the embodiment will be explained with reference to FIG. 1.

Figure 1:
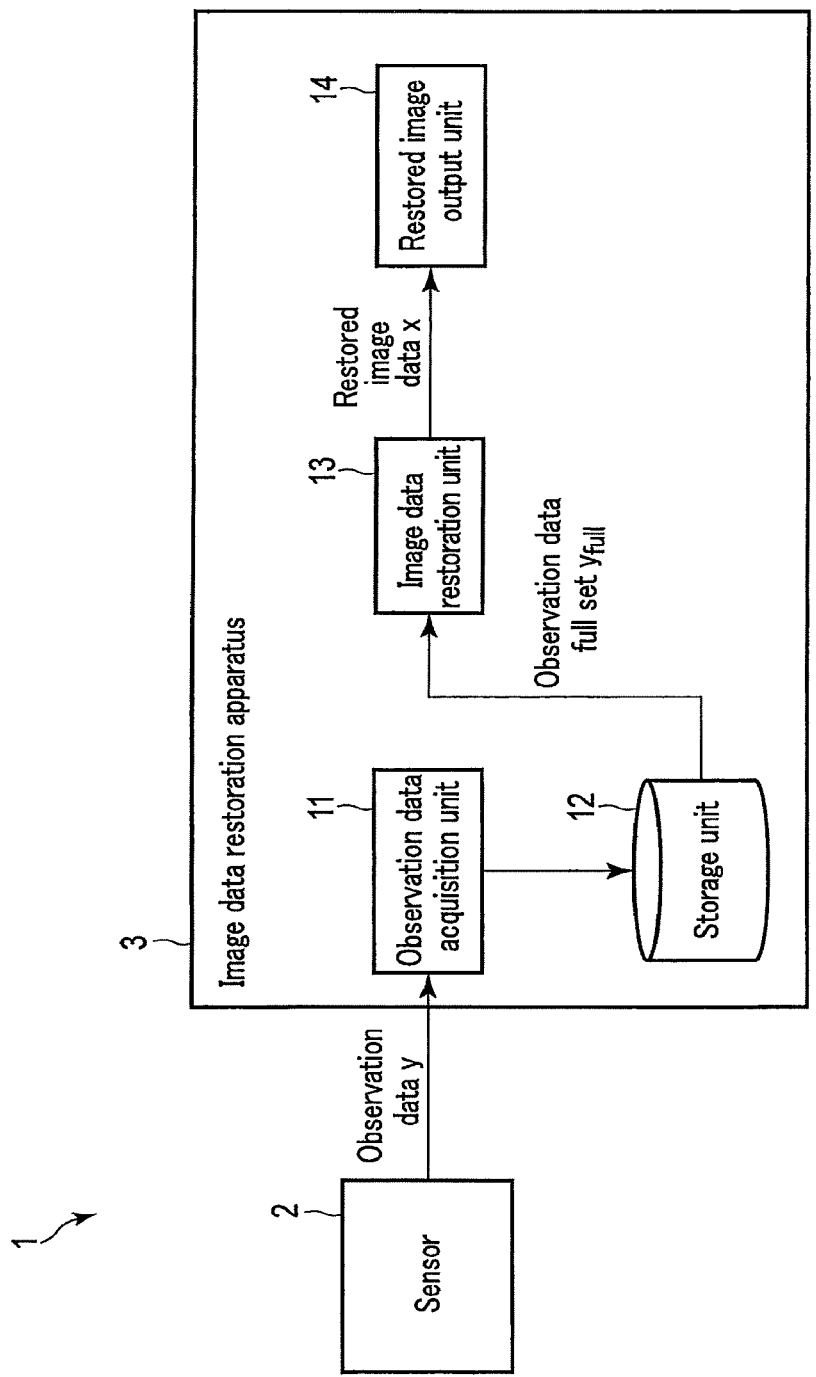
FIG. 1 is a block diagram illustrating an example of a configuration of an image data restoration system according to an embodiment.

FIG. 1 is a block diagram illustrating an example of a configuration of an image data restoration system 1 according to the present embodiment. As shown in FIG. 1, the image data restoration system 1 includes a sensor 2 and an image data restoration apparatus 3.

The sensor 2 makes an observation on an observation target (not shown in the drawings). The sensor 2 is equipped with a function of outputting, to the image data restoration apparatus 3, a signal obtained as a result of the observation as observation data y.

The sensor 2 may output the observation data y corresponding to a plurality of channels. When the sensor 2 is configured as a set of sensors, the channel may refer to each of the sensors. More specifically, when the sensor 2 corresponds to a plurality of coils mounted on an MRI apparatus, the channel corresponds to each of the coils. Also, when the sensor 2 makes an observation across multiple spectra, for example, the channel may refer to each of the spectra. More specifically, when the sensor 2 corresponds to a sensor mounted on a multispectral camera, the channel refers to each of the multiple spectra observed in the sensor. For the same observation target, the sensor 2 may output the observation data y corresponding to a plurality of channels multiple times.

An image data restoration apparatus 3 comprises an observation data acquisition unit 11, a storage unit 12 (referred to as "memory"), an image data restoration unit 13, and a restored image output unit 14. Each of the observation data acquisition unit 11, the storage unit 12, the image data restoration unit 13, and the restored image output unit 14 are configured by, for example, circuits for embodying the functional configurations that will be individually described below. Circuits corresponding to the observation data acquisition unit 11, the storage unit 12, the image data restoration unit 13, and the restored image output unit 14 operate in cooperation with each other, under the control of, for example, a processor (not shown in the drawings), and are configured to embody an image data restoration operation that will be described later.

The observation data acquisition unit 11 acquires the observation data y corresponding to the plurality of channels observed in the sensor 2. In other words, the observation data acquisition unit 11 acquires a plurality of items of observation data corresponding to the respective channels used in computation, with respect to a target. The observation data acquisition unit 11 causes the storage unit 12, for example, to store the observation data y.

The storage unit 12 includes, for example, a storage medium such as a hard disk drive (HDD), a solid state drive (SSD), etc. The storage unit 12 is a storage medium capable of reading and writing data from and to the observation data acquisition unit 11 and the image data restoration unit 13, and temporarily stores the observation data y. When a plurality of items of observation data y observed with respect to the same observation target are present, the storage unit 12 collectively stores the plurality of items of observation data y as a single observation data full set $y_{full}$. The observation data full set $y_{full}$ includes observation data y corresponding to all the channels that may be used in the image data restoration unit 13. The observation data full set $y_{full}$ is a column vector, for example, and is a vector consisting of a single column of multiple channels.

The image data restoration unit 13 reads the observation data full set $y_{full}$ from the storage unit 12, and generates image data (e.g., intermediate image data) on the observation target on the basis of the observation data full set $y_{full}$. The image data is two-dimensional or higher-dimensional data that can be visualized two-dimensionally or three-dimensionally by applying some kind of mapping to the observation data y on the observation target. The image data restoration unit 13 generates restored image data x by optimizing the image data, and outputs the restored image data x to the restored image output unit 14. Details about the processing of acquiring the restored image data x in the image data restoration unit 13 will be described later.

Upon receiving the restored image data x from the image data restoration unit 13, for example, the restored image output unit 14 outputs a restored image of the observation target on the basis of the restored image data x. The restored image output unit 14 includes, for example, a display screen (e.g., a liquid crystal display (LCD), an electroluminescence display (EL), etc.), and visually provides an image of the observation target to the user via the display screen. The restored image output unit 14 is not limited to the above-described example, and may output restored image data x to an external device (which is not shown in the drawings) having a functional configuration capable of visualizing the image data.

1.1.2 Configuration of Image Data Restoration Unit

Next, a configuration of the image data restoration unit according to the present embodiment will be explained with reference to FIG. 2.

Figure 2:
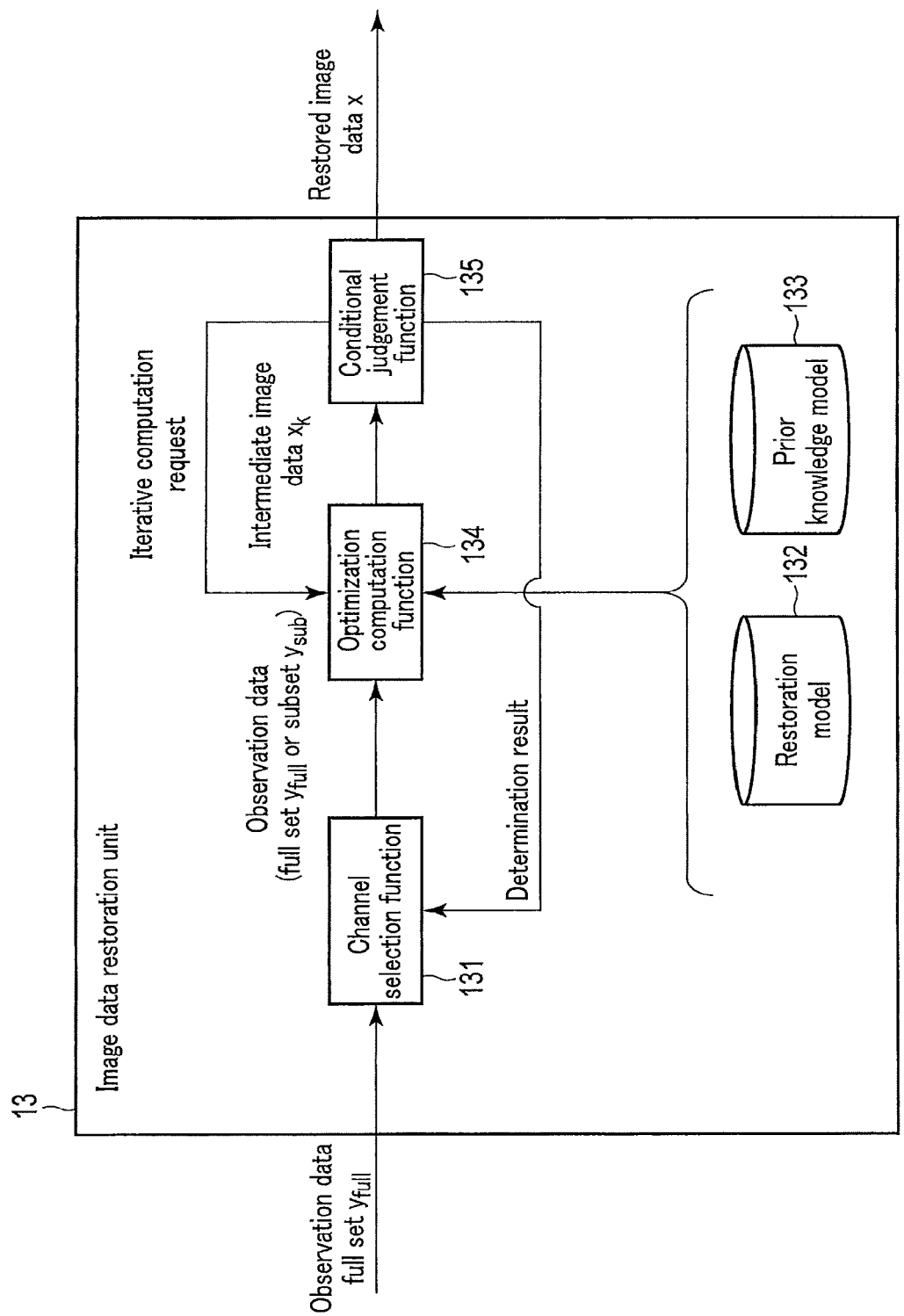
FIG. 2 is a block diagram illustrating an example of a configuration of an image data restoration apparatus according to the embodiment.

FIG. 2 is a block diagram showing an example of a configuration of the image data restoration unit 13 according to the present embodiment. As shown in FIG. 2, the image data restoration unit 13 includes a channel selection function 131, a restoration model 132, a prior knowledge model 133, an optimization computation function 134, and a conditional judgement function 135.

Of the plurality of channels corresponding to the observation data full set $y_{full}$ read from the storage unit 12, the channel selection function 131 selects a channel corresponding to the observation data input to the optimization computation function 134. When all the channels are selected, the channel selection function 131 outputs the observation data full set $y_{full}$ to the optimization computation function 134. When some of the channels are selected, the channel selection function 131 extracts observation data corresponding to the selected channels as an observation data subset $y_{sub}$, and outputs the observation data subset $y_{sub}$ to the optimization computation function 134. Of the column vector constituting the observation data full set $y_{full}$, the observation data subset $y_{sub}$ is extracted as, for example, a new column vector that includes data corresponding to a channel subset.

In other words, the channel selection function 131 selects a first channel subset including one or more channels of a plurality of channels, and a second channel subset including, of the plurality of channels, channels greater in number than the channels included in the first channel subset. The second channel subset may be, for example, a plurality of channels. The second observation data may be, for example, a plurality of items of observation data.

In the explanation that follows, the plurality of channels corresponding to the observation data full set $y_{full}$ will be referred to as a channel full set, and one or more channels corresponding to the observation data subset $y_{sub}$ will be referred to as a channel subset.

The channel selection function 131 receives, from the conditional judgement function 135, a determination result including a result of determining whether or not to discontinue optimization computation, which is iteratively executed in the optimization computation function 134. The channel selection function 131 determines whether to select the channel full set or a channel subset in accordance with, for example, the determination result. Specifically, upon receiving a determination result to discontinue the optimization computation, the channel selection function 131 selects the channel full set, and outputs an observation data full set $y_{full}$ to the optimization computation function 134. Upon receiving a determination result to continue (not discontinue) the optimization computation, the channel selection function 131 selects a channel subset, and outputs the observation data subset $y_{sub}$ to the optimization computation function 134.

When the channel selection function 131 selects a channel as a channel subset from the channel full set, various methods can be applied.

For example, the channel selection function 131 may randomly select a channel subset. In this case, the channel subset may be randomly selected whenever the observation data subset $y_{sub}$ is output to the optimization computation function 134, or may be fixed once the channel subset is selected. Such a selection method suppresses the load required in selecting a channel subset.

The channel selection function 131 may select a predetermined group of channels as a channel subset. In this case, a group of channels that is determined, based on a result of pre-training, for example, as showing the highest rate of contribution to the restored image data is selected as the predetermined group of channels. Such a selection method can be performed in advance before the optimization computation by the optimization computation function 134 is started, thus reducing the time required for the optimization computation. Also, due to the nature of pre-selection of the channel subset, such a selection method is effective particularly when the characteristics of the channels do not vary between the time of pre-training and the time of execution of the optimization computation.

The channel selection function 131 may select a channel subset on the basis of, for example, the observation data full set $y_{full}$. Specifically, the channel selection function 131 may compute a signal-to-noise ratio (SNR) of the observation data full set $y_{full}$, and select channels with a high SNR as a channel subset. In such a selection method, a new computation needs to be performed at the time of the optimization computation by the optimization computation function 134, and the time required for the optimization computation increases, compared to the above-described example. However, since the channel subset can be selected in accordance with the actually observed data, this method is effective even when the characteristics of the channels may vary between the time of pre-training, and the time of execution of the optimization computation.

The restoration model 132 and the prior knowledge model 133 are mathematical models used in the optimization computation executed by the optimization computation function 134. The restoration model 132 and the prior knowledge model 133 are, for example, stored in the storage unit 12 as a database, and suitably read by the optimization computation function 134.

The restoration model 132 is a linear transformation that allows, when true observation data (referred to as "$y_{true}$") that has no error is observed with respect to an observation target represented by true image data (referred to as "$x_{true}$"), the true observation data $y_{true}$ and the true image data $x_{true}$ to be mutually transformed. The restoration model 132 includes, for example, a linear transformation A. That is, the linear transformation A satisfies $y_{true} - A x_{true} = 0$.

The observation data y actually observed by the sensor 2 has an observation error. Also, the restored image data x does not necessarily match the true image data $x_{true}$. Thus, the computation y-Ax does not necessarily yield zero; however, it can be construed that, as it comes closer to zero, the restored image data x fits the observation data y better. In the explanation that follows, a measure of how well the restored image data x fits the observation data y will be referred to as "data fitting score", and will be expressed as $E_d(x)$. The data fitting score $E_d(x)$ indicates, for example, that the restored image data x fits the observation data y better as its value decreases.

The prior knowledge model 133 is obtained by modeling known information about the true image data $x_{true}$. For example, it is known empirically that the pixels of the true image data $x_{true}$ may be distributed not in a completely random order, but in a pattern with specific characteristics. Specifically, in terms of the rate of change of the luminance of adjacent pixels, for example, the true image data $x_{true}$ may have characteristics including a relatively large number of flat and sharp portions, and a small overall number of noise portions. The prior knowledge model 133 is obtained by pre-training related to the above-described characteristics of the true image data $x_{true}$ using training data, and develops a model as a function P(x) of the restored image data x. The function P(x) is a function of a real number.

The function P(x) may be further modeled as P(x)=Tx, for example, using a linear transformation T. In the explanation that follows, a measure of how well the restored image data x fits the prior knowledge will be referred to as "prior knowledge fitting score", and will be expressed as $E_p(x)$. The prior knowledge fitting score $E_p(x)$ indicates, for example, that the restored image data x fits the prior knowledge better as its value decreases.

Upon receiving the observation data full set $y_{full}$ or the observation data subset $y_{sub}$ from the channel selection function 131, the optimization computation function 134 reads the restoration model 132 and the prior knowledge model 133 from the storage unit 12. The optimization computation function 134 iteratively executes optimization computation to optimize (minimize) the data fitting score $E_d(x)$ and the prior knowledge fitting score $E_p(x)$, on the basis of the restoration model 132 and the prior knowledge model 133. The optimization computation function 134 generates intermediate image data $x_k$ generated during the process of the iteratively executed optimization computation. The intermediate image data $x_k$ represents image data generated when the optimization computation is iterated k times (where k is a natural number). The optimization computation function 134 transmits the intermediate image data $x_k$ to the conditional judgement function 135.

That is, when an iterative computation request is received from the conditional judgement function 135 after a k-th iteration of the optimization computation, the optimization computation function 134 receives the observation data full set $y_{full}$ or the observation data subset $y_{sub}$ from the channel selection function 131. The optimization computation function 134 executes a (k+1)-th iteration of the optimization computation, generates intermediate image data $x_{k+1}$, and transmits the intermediate image data $x_{k+1}$ to the conditional judgement function 135. Details about the optimization computation iteratively executed by the optimization computation function 134 will be described later.

In other words, the optimization computation function 134 iteratively executes a computation to optimize a fitting score between first observation data corresponding to a first channel subset and first intermediate image data based on the first observation data, and executes, after the iterative computation satisfies a predetermined condition, a computation to optimize a fitting score between second observation data corresponding to a second channel subset and second intermediate image data based on the second observation data to generate restored image data and outputs the restored image data. The fitting score may include a data fitting score indicating a fitting score of the restored image data based on a restoration model with respect to the observation data, and a prior knowledge fitting score indicating a fitting score of the restored image data with respect to a prior knowledge model of the restored image data.

The conditional judgement function 135 determines whether or not a condition for terminating the iterative processing of the optimization computation by the optimization computation function 134 is satisfied, whenever the intermediate image data $x_k$ is received. The terminating condition is set based on whether or not the evaluation function $E(x_k)$ at the time of calculation of the intermediate image data $x_k$ reaches a predetermined threshold value. In this case, the conditional judgement function 135 calculates the evaluation function $E(x_k)$ of the intermediate image data $x_k$, and determines that the terminating condition is satisfied when the evaluation function $E(x_k)$ falls below a predetermined threshold value, and that the terminating condition is not satisfied when the evaluation function $E(x_k)$ does not fall below the predetermined threshold value.

The terminating condition is not limited to the above-described example, and may be set as an upper limit value of the number of iterations of the optimization computation. In this case, the conditional judgement function 135 determines that the terminating condition is satisfied when the number of iterations of the optimization computation reaches a predetermined upper limit value, and that the terminating condition is not satisfied when the number of iterations of the optimization computation does not reach the predetermined upper limit value. If the terminating condition is set as the upper limit value of the number of iterations, the conditional judgement function 135 does not necessarily calculate the evaluation function $E(x_k)$.

If it is determined that the terminating condition is not satisfied as a result of the k-th iteration of the optimization computation, the conditional judgement function 135 transmits the determination result to the channel selection function 131, and transmits, to the optimization computation function 134, an iterative computation request for the (k+1)-th iteration of the optimization computation. On the other hand, if it is determined that the terminating condition is satisfied as a result of the k-th iteration of the optimization computation, the conditional judgement function 135 determines that the (k+1)-th iteration of the optimization computation is the last iteration of the optimization computation. That is, the conditional judgement function 135 transmits, to the channel selection function 131, a determination result indicating that the terminating condition is satisfied, and transmits, to the optimization computation function 134, an iterative computation request for the last iteration of the optimization computation.

Upon receiving the intermediate image data $x_k$ from the optimization computation function 134 as a result of the last iteration of the optimization computation, the conditional judgement function 135 outputs the intermediate image data $x_k$ to the restored image output unit 14 as the restored image data x.

In other words, the conditional judgement function 135 determines whether the iterative computation satisfies a predetermined condition. The predetermined condition may be that the evaluation function of the first intermediate image data exceeds a threshold value. Alternatively, the predetermined condition may be that the number of iterations of the iterative computation reaches a predetermined upper limit value, for example.

1.1.3 Optimization Computation in Optimization Computation Section

Next, the optimization computation that is iteratively executed in the optimization computation function 134 according to the present embodiment will be explained in detail.

1.1.3.1 Iterative Solver

The optimization computation function 134 minimizes the evaluation function $E(x)$ shown in the formula (1) below, ultimately calculating the restored image data x. That is, the iterative processing of the optimization computation in the optimization computation function 134 is formulated as a minimization problem that minimizes the following formula (1):

$$E(x)=E_d(x)+E_p(x) \qquad (1)$$

When an image restoration problem is formulated as a probabilistic maximization problem in a Maximum A Posteriori (MAP) estimation, an evaluation function in the maximization problem can be transformed into the form of the evaluation function $E(x)$ shown in the formula (1) by multiplying the logarithm of the evaluation function by −1. Thus, in either case, the image restoration problem can be reduced to the minimization problem of formula (1).

Of the terms of the evaluation function $E(x)$, the data fitting score $E_d(x)$ is formulated by the following formula (2):

$$E_d(x)=\|Ax-y\|_2^2 \qquad (2)$$

Here, $\|\cdot\|_2$ represents the L2-norm.

Assuming that the prior knowledge fitting score $E_p(x)$ is formulated using the L2-norm, as in the data fitting score $E_d(x)$, the minimization problem shown in the formula (1) can be reduced to a linear programming problem that can be solved by obtaining restored image data x that makes the derivative function obtained by first-order differentiation of the evaluation function $E(x)$ zero. Such a linear programming problem yields a closed-form solution by using, for example, a conjugate gradient method.

However, when an entity that occurs in nature is the observation target, true image data $x_{true}$ is often known, as prior knowledge, as being sparse. In this case, a solution to the above-described linear programming problem may not be able to accurately restore the true image data $x_{true}$. Accordingly, to improve the accuracy of the restoration, a term of the L1-norm or the trace norm, by which sparsity can be represented, is often included to represent the prior knowledge fitting score $E_p(x)$. The prior knowledge fitting score $E_p(x)$ is formulated using the L1-norm, for example, as in the following formula (3).

$$E_p(x)=\lambda P(x)=\lambda \|T_x\|_1 \qquad (3)$$

Here, $\|\cdot\|_1$ represents the L1-norm. $\lambda$ is a real number equal to or greater than 0. When $\lambda=0$, the evaluation function $E(x)$ is a function that does not evaluate the prior knowledge fitting score $E_p(x)$.

In this case, it is difficult to obtain a closed-form solution to the minimization problem shown in formula (1), using a scheme similar to the case of the L2-norm. On the other hand, it is known that a minimization problem including the L1-norm yields a closed-form solution by transforming a given equation into a form that satisfies limited conditions.

Specifically, a minimization problem including the L1-norm, for example, can be solved by applying soft thresholding. The soft thresholding is a computation that gives a closed-form solution to a minimization problem expressed by the following formula (4).

$$\min_p \left\{ \frac{1}{2} \|p - p_o\|_2^2 + \alpha \|p\|_1 \right\} \tag{4}$$

Here, vectors p and p0 are column vectors. The design variable α is a real number equal to or greater than zero. Each element of the vector p that gives a solution to the formula (4) is given by the following formula (5), where the superscript index i denotes the element number of the vector.

$$\frac{p_o^{(i)}}{|p_o^{(i)}|} \max \left( |p_o^{(i)}| - \alpha, 0 \right) \tag{5}$$

Typically, a solution to the minimization problem expressed by the formula (1) is obtained by a method that splits the minimization problem into two or more minimization problems including an optimization problem to which soft thresholding, for example, is applicable, by introducing additional variables.

The optimization computation function 134 executes a process of solving each of the above-described two or more minimization problems as an iteration of the optimization computation. The optimization computation function 134 iteratively and alternately solves the above-described two or more minimization problems, ultimately calculating the restored image data x, which minimizes the formula (1).

As the above-described iterative solver, various solutions are known, such as penalty methods, the Alternating Direction Method of Multipliers (ADMM), and the Split Bregman method. The optimization computation function 134 in the present embodiment is not limited to the above-described example, and may be applicable to a given solution that solves an optimization problem including a term of the data fitting score $E_d(x)$ using the iterative solver.

1.1.3.2 Case where Penalty Method is Applied

Hereinafter, a case will be explained where a penalty method is applied to the optimization computation function 134 as an example of the iterative solver to obtain restored image data x by iteratively executing the optimization computation.

The penalty method introduces additional variables z as internal data, thus splitting the formula (1) into two minimization problems, namely, a minimization problem configured by the L2-norm and a minimization problem including the L1-norm. Specifically, in the (k+1)-th iteration of the optimization computation, the optimization computation function 134 solves the minimization problems shown in the following formulas (6)-(8).

$$x_{k+1} = \min_x \{ \|Ax-y\|_2^2 + \delta_k \|Tx - z_k\|_2^2 \} \tag{6}$$

$$z_{k+1} = \min_z \{ \lambda \|x\|_1 + \delta_k \|Tx_k - z\|_2^2 \} \tag{7}$$

$$\delta_{k+1} = c\delta_k \tag{8}$$

Here, the design variable c is a real number equal to or greater than one, and the design variable $\delta_k$ is a real number equal to or greater than zero. As shown in the formula (8), the design variable $\delta_k$ gradually increases from a small value to a large value as the number of iterations of the optimization processing is incremented. When the design variable $\delta_k$ reaches a sufficiently large value as a result of the iterative optimization processing, the solution obtained by the formulas (6)-(8) becomes equivalent to the solution of the formula (1).

The design variables c and $\delta_k$ are not limited to the above-described examples, and may be modified in various ways. For example, the design variable c in the formula (8) is set as a constant that does not depend on the number of iterations; however, it is not limited thereto, and may be dynamically set in accordance with the number of iterations. The design variable $\delta_k$ may be set so as to satisfy the following formula (9) with respect to the design variable c.

$$\delta_{k+1} = \delta_k + c \tag{9}$$

1.1.3.3 Case where ADMM Technique is Applied

Next, a case will be explained where the ADMM technique is applied to the optimization computation function 134, instead of the penalty method.

The ADMM technique introduces additional variables z and d as internal data, thus splitting the formula (1) into two minimization problems, namely, a minimization problem including the L2-norm, and a minimization problem including the L1-norm. Specifically, in the (k+1)-th iteration of the optimization computation, the optimization computation function 134 solves the minimization problems expressed by the following formulas (10)-(12).

$$x_{k+1} = \min_x \{ \|Ax-y\|_2^2 + \delta \|Tx + d_k - z_k\|_2^2 \} \tag{10}$$

$$z_{k+1} = \min_z \{ \lambda \|z\|_1 + \delta \|Tx_{k+1} + d_k - z\|_2^2 \} \tag{11}$$

$$d_{k+1} = d_k \gamma (Tx_{k+1} z_{k+1}) \tag{12}$$

Here, the design variable δ is a positive real number, and the design variable γ is a real number.

When the ADMM technique is applied to the optimization computation that is iteratively executed in the optimization computation function 134, the ADMM technique is not limited to the formulas (10)-(12), and may be transformed into a form that can be computed at a higher speed. As a method for accelerating the ADMM technique, a method shown in the following document ([AADMM]), for example, is applicable.

[AADMM] Mojtaba Kadkhodaie et al., "Accelerated Alternating Direction Method of Multipliers", Proceedings of the 21th ACM SIGKDD International Conference on Knowledge Discovery and Data Mining, pages 497-506.

1.2 Operation

Next, the image data restoration operation in the image data restoration apparatus of the present embodiment will be explained. FIG. 3 is a flowchart illustrating an example of the operation of the image data restoration apparatus according to the present embodiment.

In step ST10, the observation data acquisition unit 11 acquires observation data y observed in the sensor 2 and corresponding to a plurality of channels, as shown in FIG. 3. The storage unit 12 collectively stores the acquired observation data y for the same observation target as an observation data full set $y_{full}$ corresponding to the channel full set.

In step ST20, the channel selection function 131 selection function 131 selects a channel to be used as a channel subset from the channel full set.

In the subsequent steps ST30 to ST70, iterative processing of optimization computation is executed in the optimization computation function 134 and the conditional judgement function 135. In the explanation that follows, let us assume that a k-th iteration of the optimization computation, at which the iterative processing is not discontinued, is executed at steps ST30 to ST50, and the last iteration of the optimization computation is executed in steps ST60 and ST70.

In step ST30, the channel selection function 131 applies an observation data subset $y_{sub}$ as observation data y used at the time of the k-th iteration of the optimization computation. Specifically, the channel selection function 131 extracts an observation data subset $y_{sub}$ corresponding to the channel subset selected in step ST20, and transmits the extracted observation data subset $y_{sub}$ to the optimization computation function 134.

In step ST40, the optimization computation function 134 executes the k-th iteration of the optimization computation to optimize a data fitting score $E_d(x_k)$ based on the restoration model 132 and a prior knowledge fitting score $E_p(x_k)$ based on the prior knowledge model 133, using the observation data subset $y_{sub}$, thereby generating intermediate image data $x_k$. The optimization computation function 134 transmits the intermediate image data $x_k$ to the conditional judgement function 135.

In step ST50, the conditional judgement function 135 determines whether a condition for terminating the iterative processing of the optimization computation is satisfied, after the k-th iteration of the optimization computation is finished.

When it is determined that the terminating condition is not satisfied (no in step ST50), the conditional judgement function 135 transmits the determination result to the channel selection function 131, transmits an iterative computation request for a (k+1)-th iteration of the optimization computation to the optimization computation function 134, and returns to step ST30. In step ST30, the channel selection function 131 applies an observation data subset $y_{sub}$ to the (k+1)-th iteration of the optimization computation, based on the determination result.

On the other hand, when it is determined that the terminating condition is satisfied (yes in step ST50), the conditional judgement function 135 transmits the determination result to the channel selection function 131, transmits an iterative computation request for the last iteration of the optimization computation to the optimization computation function 134, and proceeds to step ST60. In step ST60, the channel selection function 131 applies an observation data full set $y_{full}$ to the (k+1)-th iteration of the optimization computation, based on the determination result. Specifically, the channel selection function 131 extracts an observation data full set $y_{full}$ corresponding to the channel full set, and transmits the extracted observation data full set $y_{full}$ to the optimization computation function 134.

In step ST70, the optimization computation function 134 executes the (k+1)-th iteration of the optimization computation to optimize the data fitting score based on the restoration model 132 and the prior knowledge fitting score based on the prior knowledge model 133, using the observation data full set $y_{full}$, and generates intermediate image data $x_{k+1}$. The optimization computation function 134 transmits the intermediate image data $x_{k+1}$ to the conditional judgement function 135. The conditional judgement function 135 transmits, to the restored image output unit 14, the intermediate image data $x_{k+1}$ as restored image data x.

In step ST80, the restored image output unit 14 outputs a restored image using the restored image data x.

In the above-described manner, the image data restoration operation is completed.

1.3 Advantageous Effect of Present Embodiment

According to the present embodiment, it is possible to reduce the time required to restore the image data, while suppressing deterioration in image quality. This advantageous effect will be explained below.

The optimization computation function 134 of the image data restoration apparatus 3 of the present embodiment iteratively executes the optimization computation to optimize the data fitting score $E_d(x)$ and the prior knowledge fitting score $E_p(x)$. Whenever the iterative processing of the optimization computation is executed, the conditional judgement function 135 determines whether or not to discontinue the iterative processing, and transmits the determination result to the channel selection function 131. In accordance with the determination result, the channel selection function 131 applies an observation data full set $y_{full}$ corresponding to the channel full set to the last iteration of the optimization computation, and applies an observation data subset $y_{sub}$ corresponding to the channel subset to iterations of the optimization computation other than the last one.

In other words, the optimization computation function 134 iteratively executes a computation to optimize a fitting score between first observation data corresponding to a first channel subset and first intermediate image data based on the first observation data. After the iterative computation satisfies a predetermined condition, the optimization computation function 134 executes a computation to optimize a fitting score between second observation data corresponding to a second channel subset having channels greater in number than the first channel subset and the second intermediate image data based on the second observation data to generate restored image data and outputs the restored image data.

By thus using part of the observed information while the optimization computation is iterated, it is possible to reduce the amount of processing of the optimization computation, resulting in an increase in the processing speed. Also, by using all the observed information (or an amount of information greater than the information used during the iterative processing of the optimization computation) in the last iteration of the optimization computation, it is possible to suppress deterioration in image quality caused by using only part of information in the course of the iterative processing of the optimization computation.

The optimization computation function 134 executes the penalty method or the ADMM method by introducing additional variables z as internal data. It is thereby possible for the optimization computation function 134 to alternately execute the computation of optimizing the restored image data x and the computation of optimizing the internal data. By thus iterating the alternately executed computations, it is possible for the optimization computation function 134 to ultimately optimize the data fitting score $E_d(x)$ and the prior knowledge fitting score $E_p(x)$.

2. MODIFICATIONS

The image data restoration apparatus according to the present embodiment is not limited to the above-described example, and may be modified in various ways.

2.1. First Modification

As described above, the data fitting score $E_d(x)$ represents a fitting score of the restored image data x with respect to the observation data y, and the prior knowledge fitting score $E_p(x)$ represents a fitting score of the restored image data x with respect to the prior knowledge. To optimize the data fitting score $E_d(x)$ and the prior knowledge fitting score $E_p(x)$, it is desirable that the balance between the fitting scores is maintained in each iteration of the optimization computation.

When the number of channels that are used is varied in accordance with the number of iterations of the optimization computation, as in the present embodiment, the value of the data fitting score $E_d(x)$ may vary in accordance with a difference in data sets, depending on whether the observation data subset $y_{sub}$ or the observation data full set $y_{full}$ is used. On the other hand, the value of the prior knowledge fitting score $E_p(x)$ does not vary as significantly as the data fitting score $E_d(x)$, regardless of whether the observation data full set $y_{full}$ or the observation data subset $y_{sub}$ is used. Thus, the balance between the data fitting score $E_d(x)$ and the prior knowledge fitting score $E_p(x)$ may vary, depending on whether the observation data subset $y_{sub}$ or the observation data full set $y_{full}$ is used.

Accordingly, to maintain the balance in fitting score, it is desirable that the value of the data fitting score $E_d(x)$ is scaled so as not to vary significantly no matter which of the observation data full set $y_{full}$ and the observation data subset $y_{sub}$ is used.

Specifically, when the observation data subset $y_{sub}$ is applied, the optimization computation function 134 may scale the data fitting score $E_d(x)$ using the following formula (13), for example, in place of the formula (2).

$$E_d(x) = \beta_M \|A_{sub} x - y_{sub}\|_2^2 \qquad (13)$$

Here, the coefficient $\beta_M$ is a positive real number, and denotes a scaling factor of the data fitting score.

More specifically, the optimization computation function 134 may scale the data fitting score $E_d(x)$ in accordance with, for example, a ratio between the number of channel subsets and the number of channel full sets, as shown by the following formula (14).

$$\beta_M = \frac{M_{full}}{M_{sub}} \qquad (14)$$

Here, $M_{sub}$ denotes the number of channels of the channel subset, and $M_{full}$ denotes the number of channels of the channel full set.

The optimization computation function 134 may scale the data fitting score $E_d(x)$ in accordance with the size of the norm of the observation data subset $y_{sub}$ and the size of the norm of the observation data full set $y_{full}$, as shown, for example, by the following formula (15).

$$\beta_M = \frac{\|y_{full}\|_2^2}{\|y_{sub}\|_2^2} \qquad (15)$$

When the observation data y is not a vector but a matrix, the L2-norm in the formula (10) may be the Frobenius norm.

FIG. 4 is a flowchart showing an example of an image data restoration operation according to a first modification of the present embodiment. In FIG. 4, step ST35 is further provided in addition to FIG. 3 of the present embodiment. The operation of FIG. 4 is the same as that of FIG. 3, except for the operation in step ST35. In the following, operations (steps ST30, ST35, and ST40) relating to the optimization computation by the optimization computation function 134 will be explained, and the explanation of the other operations (steps ST10 and ST20, and the steps subsequent to ST50) will be omitted.

In step ST30, the channel selection function 131 applies an observation data subset $y_{sub}$ as observation data y used at the time of a k-th iteration of the optimization computation. Specifically, the channel selection function 131 extracts an observation data subset $y_{sub}$ corresponding to a channel subset selected in step ST20, and transmits the extracted observation data subset $y_{sub}$ to the optimization computation function 134.

In step ST35, the optimization computation function 134 scales a data fitting score $E_d(x)$. Thereby, the balance in value between the data fitting score $E_d(x)$ and a prior knowledge fitting score $E_p(x)$ will be equivalent to the balance at the time of application of an observation data full set $y_{full}$.

In step ST40, the optimization computation function 134 executes a k-th iteration of the optimization computation to optimize the data fitting score $E_d(x_k)$ based on the restoration model 132 and the prior knowledge fitting score $E_p(x_k)$ based on the prior knowledge model 133, using the observation data subset $y_{sub}$, thereby generating intermediate image data $x_k$. The optimization computation function 134 transmits the intermediate image data $x_k$ to the conditional judgement function 135.

By the above-described operation, it is possible to suppress a significant change in balance between the data fitting score $E_d(x)$ and the prior knowledge fitting score $E_p(x)$ regardless of whether the observation data subset $y_{sub}$ or the observation data full set $y_{full}$ is applied. Thus, an optimization problem to which the observation data subset $y_{sub}$ is applied may be regarded as a problem that is approximate to an optimization problem to which the observation data full set $y_{full}$ is applied. Accordingly, even when the number of channels to which observation data is applied is dynamically changed at the time of iterative execution of the optimization computation, the optimization computation can be executed without losing convergence, resulting in a stable operation of the iterative computation.

2.2 Second Modification

In the present embodiment, a case has been explained where the observation data full set $y_{full}$ is applied to the last iteration of the optimization computation, and the observation data subset $y_{sub}$ is applied to the other iterations of the optimization computation; however, the configuration is not limited thereto. For example, the observation data full set $y_{full}$ may be suitably applied to a given number of iterations of the optimization computation. More specifically, the conditional judgement function 135 may determine whether or not to use a channel subset, in addition to whether or not the terminating condition is satisfied, whenever the optimization computation is executed.

The conditional judgement function 135 may determine whether to use a channel subset, for example, in accordance with the number of iterations of the optimization computation. More specifically, the conditional judgement function 135 may determine that a channel subset is not to be used (the channel full set is used) in the first iterative computation, and that a channel subset is to be used in the subsequent iterations. In this manner, by using the channel full set at the beginning of the iterative processing, the accuracy of the intermediate image data $x_k$ generated at the beginning can be enhanced even when data that does not fit the restored image data x is input as an initial value of the optimization computation. It is thereby possible to stabilize the convergence of the optimization computation.

The conditional judgement function 135 is not limited to the above-described example, and may determine that the channel full set is used for a given number of iterations of the optimization computation. Specifically, the conditional judgement function 135 may determine that the channel full set is to be used for the first few iterations of the optimization computation, and may determine that the channel full set is to be used for the last few iterations of the optimization computation.

Figure 5:
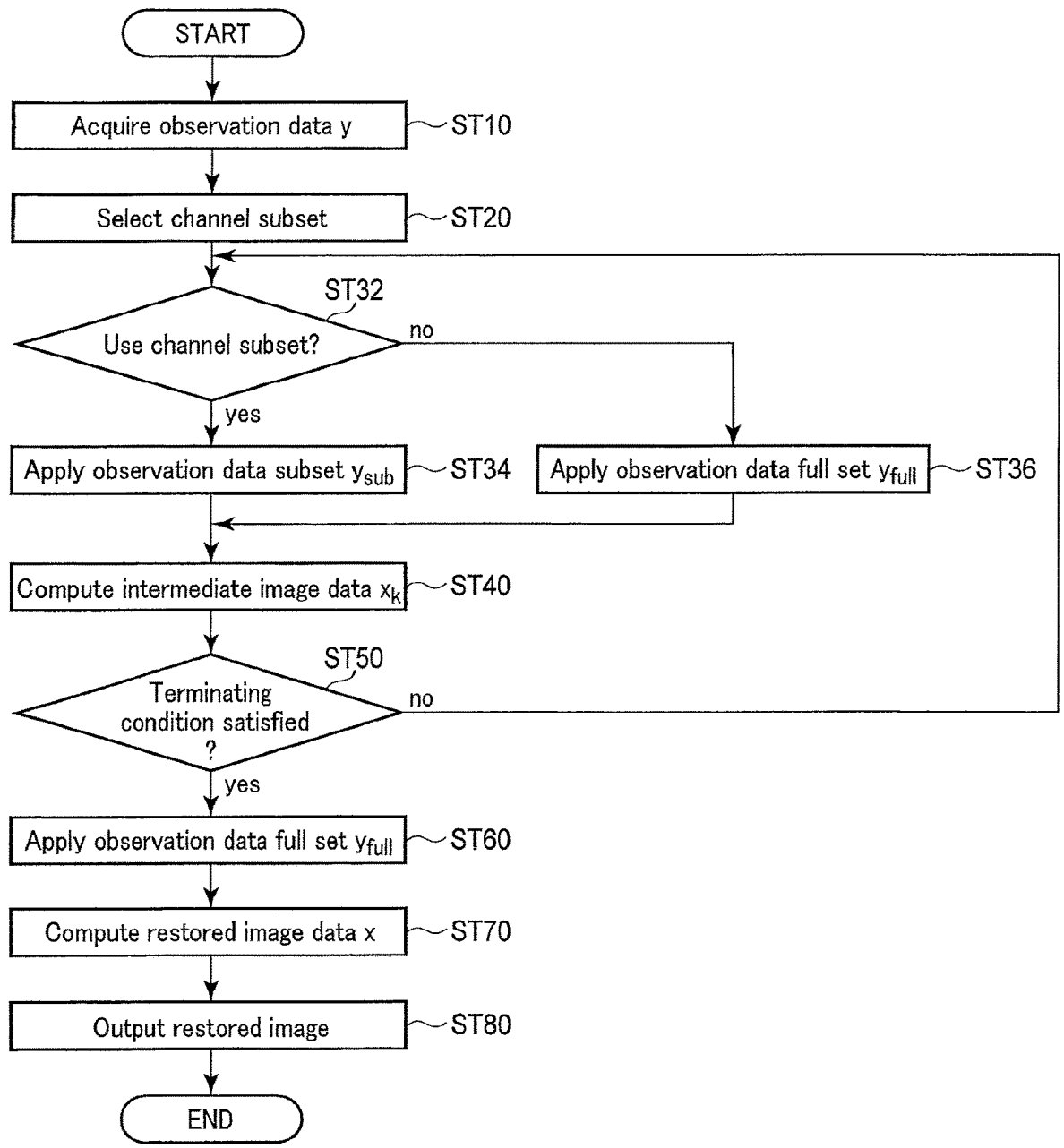
FIG. 5 is a flowchart illustrating an example of an image data restoration operation in an image data restoration apparatus according to a second modification of the embodiment.

FIG. 5 is a flowchart illustrating an example of an image data restoration operation in an image data restoration apparatus according to a second modification of the present embodiment. In FIG. 5, steps ST32, ST34, and ST36 are added, in place of step ST30, to FIG. 3 of the present embodiment. The operations of FIG. 5 other than steps ST32, ST34, and ST36 are the same as those of FIG. 3. In the following, operations (steps ST32, ST34, ST36, and ST40) relating to the optimization computation by the optimization computation function 134 will be explained, and the explanation of the other operations (steps ST10 and ST20, and the steps subsequent to ST50) will be omitted.

In step ST32, the conditional judgement function 135 determines whether to use a channel subset at the time of a (k+1)-th iteration of the optimization computation.

When the conditional judgement function 135 determines that a channel subset is to be used (yes in step ST32), the conditional judgement function 135 transmits a determination result to use the channel subset to the channel selection function 131 at the time of the (k+1)-th iteration of the optimization computation, and proceeds to step ST34. In step ST34, the channel selection function 131 applies an observation data subset $y_{sub}$ at the time of the (k+1)-th iteration of the optimization computation based on the determination result of the conditional judgement function 135 in step ST32.

On the other hand, when the conditional judgement function 135 determines that a channel subset is not to be used (No in step ST32), a determination result indicating that the channel full set is to be used at the (k+1)-th iteration of the optimization computation is transmitted to the channel selection function 131, and proceeds to step ST36. In step ST36, the channel selection function 131 applies an observation data full set $y_{full}$ at the time of the (k+1)-th iteration of the optimization computation, based on the determination result by the conditional judgement function 135 in step ST32.

In step ST40, the optimization computation function 134 executes a (k+1)-th iteration of the optimization computation to optimize a data fitting score $E_d(x_{k+1})$ based on the restoration model 132 and a prior knowledge fitting score $E_p(x_{k+1})$ based on the prior knowledge model 133, using the observation data subset $y_{sub}$ or the observation data full set $y_{full}$ and generates intermediate image data $x_{k+1}$. The optimization computation function 134 transmits the intermediate image data $x_{k+1}$ to the conditional judgement function 135.

By the above-described operation, the optimization computation function 134 can selectively use the channel full set and the channel subset for a given number of iterations of the optimization computation. Thereby, the optimization computation function 134 can use the channel full set for an iteration of the optimization computation that has a large effect on the image quality of the restored image data x, and can use a channel subset for an iteration of the optimization computation that has little effect thereon.

More specifically, by using the channel full set at the beginning of the iterative processing, the convergence can be enhanced even in the case where the accuracy of the initial value of the restored image data x is low. Also, by using the channel full set at the end of the iterative processing, for example, it is possible to suppress deterioration of the final image quality of the restored image data x.

2.3 Third Modification

In the present embodiment, a case has been explained where the optimization computation is performed for the observation data y from the sensor 2, based on actual channels (sensors or spectra); however, the configuration is not limited thereto. For example, the image data restoration unit 13 may channel-convert observation data y associated with actual channels into observation data y' associated with virtual channels, and perform optimization computation using the observation data y'.

FIG. 6 is a block diagram showing an example of a configuration of an image data restoration unit according to a third modification of the present embodiment. As shown in FIG. 6, the image data restoration unit 13 further comprises a channel conversion function 136.

Upon reading an observation data full set $y_{full}$ from the storage unit 12, the channel conversion function 136 converts actual channels of the observation data full set $y_{full}$ into virtual channels, and generates an observation data full set $y'_{full}$. Specifically, the channel conversion function 136 applies, to the observation data full set $y_{full}$, a linear transformation including an orthogonal transformation based on principal component analysis or the singular value decomposition, for example. Thereby, the observation data full set $y_{full}$ is transformed into an observation data full set $y'_{full}$ corresponding to virtual channels that are divided into a channel with a relatively large eigenvalue and a channel with a value fairly close to zero. The channel conversion function 136 transmits the transformed observation data full set $y'_{full}$ to the channel selection function 131.

Of the plurality of virtual channels corresponding to the observation data full set $y'_{full}$, the channel selection function 131 selects a virtual channel corresponding to the observation data input to the optimization computation function 134. When all the virtual channels (virtual channel full set) are selected, the channel selection function 131 transmits the observation data full set $y'_{full}$ to the optimization computation function 134. When part of the virtual channel full set (virtual channel subset) is selected, the channel selection function 131 extracts observation data corresponding to the virtual channel subset as an observation data subset $Y'_{sub}$, and transmits the extracted observation data subset $y'_{sub}$ to the optimization computation function 134. The observation data subset $y'_{sub}$ is extracted as a new column vector including a column that corresponds to a virtual channel with a relatively large eigenvalue, for example, from the column vectors constituting the observation data full set $y'_{full}$.

By the above-described configuration, it is possible to suppress deterioration in restoration accuracy of image data caused by performing the optimization computation with a reduced number of channels.

FIG. 7 is a flowchart illustrating an example of an image data restoration operation in an image data restoration apparatus according to the third modification of the present embodiment. In FIG. 7, step ST15 is added, and steps ST20A and ST30A are added in place of steps ST20 and ST30, to FIG. 3 of the present embodiment. In the following, the entire processing will be explained; however, the explanation of operations similar to those of FIG. 3 will be suitably omitted.

As shown in FIG. 7, in step ST10, the observation data acquisition unit 11 acquires observation data y corresponding to a plurality of channels observed in the sensor 2, and causes the storage unit 12 to store the acquired observation data y.

In step ST15, the channel conversion function 136 applies a linear transformation to an observation data full set $y_{full}$, and converts actual channels into virtual channels. Thereby, the channel conversion function 136 generates an observation data full set $y'_{full}$, and transmits the generated observation data full set $y'_{full}$ to the channel selection function 131.

In step ST20A, the channel selection function 131 selects, from the virtual channel full set, virtual channels to be used as a virtual channel subset.

In step ST30A, the channel selection function 131 applies an observation data subset $y'_{sub}$ as observation data y to be used at the time of a k-th iteration of the optimization computation. Specifically, the channel selection function 131 extracts an observation data subset $y'_{sub}$ corresponding to a virtual channel subset selected in step ST20A, and transmits the extracted observation data subset $y'_{sub}$ to the optimization computation function 134.

The operations in steps ST40 and ST50 are similar to those of FIG. 3, and the explanation thereof will be omitted.

In step ST60, the channel selection function 131 applies an observation data full set $y'_{full}$ to a (k+1)-th iteration of the optimization computation on the basis of the determination result of the k-th iteration of the optimization computation. Specifically, the channel selection function 131 extracts an observation data full set $y'_{full}$ corresponding to a virtual channel full set, and transmits the extracted observation data full set $y'_{full}$ to the optimization computation function 134.

The operations in steps ST70 and ST80 are similar to those of FIG. 3, and the explanation thereof will be omitted.

In the above-described manner, the image data restoration operation is completed.

In this manner, the channel conversion function 136 converts actual channels of the observation data y into virtual channels. Thereby, the channel selection function 131 is capable of narrowing the number of channels having significant information. By preferentially selecting virtual channels having a large eigenvalue, for example, the channel selection function 131 is capable of reducing the number of channels used in the optimization computation, without drastically losing information that is inherent in the observation data y. Accordingly, it is possible to reduce the time required to restore image data, while suppressing deterioration in image quality.

3. APPLICATIONS

The above-described embodiment and its modifications can be applied to various apparatuses. Some specific applications will be explained below.

3.1 Application to MRI Apparatus

An application to an MRI apparatus will be explained.

As described above, when the present embodiment is applied to an MRI apparatus, the iterative processing of the optimization computation by the optimization computation function 134 corresponds to a process of reconstructing a reconstruction image from k-space data. That is, the observation data y and the restored image data x correspond to k-space data and a reconstruction image, respectively, and the channels correspond to coils for observing the k-space data.

The linear transformation A used for the data fitting score $E_d(x)$ includes a matrix obtained by multiplying, for example, a coil sensitivity matrix S by a Fourier transform matrix F.

The coil sensitivity matrix S represents a sensitivity of each coil with respect to the restored image data. When the coils have different SNRs, or there is a correlation between the coils, the coil sensitivity matrix S may include a correction term.

When the sensor 2 observes k-space data using a scheme called a Cartesian scan, the Fourier transform matrix F is defined as the discrete Fourier transform. When the sensor 2 observes k-space data using a scheme called a Non-Cartesian scan, the Fourier transform matrix F is defined as the nonequispaced discrete Fourier transform.

The linear transformation T used for the prior knowledge fitting score $E_p(x)$ includes, for example, a total variation term. The total variation term includes, for example, information about the luminance difference or differentiation between adjacent pixels. That is, the prior knowledge fitting score $E_p(x)$ functions as a constraint term indicating spatial smoothness of the restored image data x.

When the MRI apparatus makes observations in a time series across multiple times, the observation data y and the restored image data x may include time information. Specifically, when the observation data y and the restored image data x at a certain time are expressed in a column vector, the observation data y and the restored image data x in time series may be expressed in a matrix form.

When the observation data y and the restored image data x in time series are expressed in a matrix form, the data fitting score $E_d(x)$ and the prior knowledge fitting score $E_p(x)$ may be respectively formulated as in the following formulas (16) and (17):

$$E_d(x)=\|Ax-y\|_F^2 \tag{16}$$

$$E_p(x)=\lambda P(x)=\lambda\|Tx\|_* \tag{17}$$

Here, $\|\cdot\|_F$ represents the Frobenius norm, and $\|\cdot\|_*$ represents the trace form.

When the trace norm is used for the prior knowledge fitting score $E_p(x)$, then an optimization problem is solved for the formula including the trace norm. Thereby, the prior knowledge fitting score $E_p(x)$ also functions as a constraint term that indicates temporal smoothness.

It is known that an optimization problem relating to a formula including the trace norm yields a closed-form solution by application of the singular value thresholding. The singular value thresholding is a computation that outputs a matrix calculated by the following procedures (i)-(iii).

(i) A singular value decomposition $x=U\Lambda V^*$ is performed for the restored image data x expressed by a matrix.

(ii) By applying soft thresholding to data obtained by vectorizing the orthogonal component of the orthogonal matrix $\Lambda$, a coefficient $\Lambda'$ is obtained.

(iii) A matrix obtained by applying a computation $U\Lambda'V^*$ to the coefficient $\Lambda'$ is output.

3.2 Application to Multispectral Camera

Next, an application to a multispectral camera will be explained.

When the present embodiment is applied to a multispectral camera, as described above, the iterative processing of the optimization computation by the optimization computation function 134 corresponds to a process of removing noise contamination in channels used for visualization. That is, the observation data y and the restored image data x respectively correspond to image data including noise and image data from which noise is removed, and the channels correspond to spectra.

In this case, the linear transformation A used in the data fitting score $E_d(x)$ includes, for example, an identity transformation matrix.

The linear transformation T used in the prior knowledge fitting score $E_p(x)$ includes, for example, a basis matrix obtained by pre-training. The basis matrix is calculated by applying principal component analysis to image data captured in advance using the same multispectral camera. The prior knowledge fitting score $E_p(x)$ is formulated as, for example, an error when restored image data x is projected onto a low-rank orthogonal basis obtained by pre-training.

3.3 Application to Spectral X-ray Apparatus

Next, an application to a spectral X-ray apparatus will be explained. Examples of the spectral X-ray apparatus include a CT apparatus, a dual-energy apparatus, and a photon counting apparatus.

As described above, when the present embodiment is applied to an X-ray spectral apparatus, the iterative processing of the optimization computation by the optimization computation function 134 corresponds to a process of reconstructing a material discrimination image from raw data. That is, the observation data y and the restored image data x respectively correspond to raw data and a reconstruction image, and the channels correspond to spectra.

The linear transformation A used in the data fitting score $E_d(x)$ includes, for example, a transformation matrix of the material discrimination image and the raw data. When the raw data is a sinogram, the transformation matrix includes the Radon transform.

The linear transformation T used for the prior knowledge fitting score $E_p(x)$ includes, for example, a total variation term.

4. OTHERS

The above-described embodiment may be suitably modified as will be described below.

For example, the optimization computation function 134 is described as a single functional block in the above-described embodiment; however, the single functional block may be embodied by mounting a plurality of computational processors. Specifically, the optimization computation function 134 may be configured to perform distributed processing on the computational part for evaluating the data fitting score $E_d(x)$, using the plurality of computational processors.

That is, the computation for evaluating the data fitting score $E_d(x)$ may be performed independently for the respective channels. Thus, each of the computational processors may be configured to handle the computation of a part corresponding to an equally distributed channel at the time of evaluation of the data fitting score $E_d(x)$. Thereby, it is possible to reduce the computation time required to evaluate the data fitting score $E_d(x)$ and to reduce the load applied to one computational processor.

Also, the steps shown in the image data restoration operation according to the above-described embodiment may be executed based on software described as a program. By storing such a program in a general-purpose computer system and causing the image data restoration apparatus 3 to read the program, the image data restoration operation in the above-described embodiment may be embodied.

The above-described program may be stored in a given recording medium that can be read by the image data restoration apparatus 3. Examples of such a recording medium include a magnetic disc (a flexible disc, a hard disc, etc.), an optical disc (CD-ROM, CD-R, CD-RW, DVD-ROM, DVD±R, DVD±RW, etc.), a semiconductor memory, and a storage medium similar thereto. Furthermore, the storage medium is not limited to a medium independent from the image data restoration apparatus 3, and includes a recording medium in the image data restoration apparatus 3 capable of storing a program downloaded through a local area network (LAN), the Internet, etc. The image data restoration apparatus 3 reads the above-described program from the storage medium, thereby causing a processor in the image data restoration apparatus 3 to execute the steps of the image data restoration operation. The image data restoration apparatus 3 may be configured to cause an operating system (OS), database management software, or middleware (MW) that works on the image data restoration apparatus 3 to execute part of the program read from the storage medium.

The image data restoration apparatus 3 may be configured either as a single apparatus consisting of a personal computer, a microcomputer, etc., or as a system in which a plurality of apparatuses are connected through a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image data restoration apparatus, comprising:
    processing circuitry configured to:
        acquire, with respect to a target, a plurality of items of observation data respectively corresponding to a plurality of channels used in a computation;
        select a first channel subset and a second channel subset, the first channel subset including one or more channels of the plurality of channels, the second channel subset including, of the plurality of channels, channels larger in number than the first channel subset; and
        iteratively execute a computation to optimize a fitting score between first observation data corresponding to the first channel subset and first intermediate image data based on the first observation data, and execute, after the iterative computation satisfies a predetermined condition, a computation to optimize a fitting score between second observation data corresponding to the second channel subset and second intermediate image data based on the second observation data to generate restored image data and output the restored image data.

2. The image data restoration apparatus according to claim 1, wherein
    the second channel subset is the plurality of channels, and the second observation data is the plurality of items of observation data.

3. The image data restoration apparatus according to claim 1, wherein
the fitting score includes a data fitting score and a prior knowledge fitting score, the data fitting score indicating a fitting score of the restored image data based on a restoration model with respect to the observation data, the prior knowledge fitting score indicating a fitting score of the restored image data with respect to a prior knowledge model of the restored image data,
the processing circuitry is further configured to:
execute a computation to optimize the data fitting score and the prior knowledge fitting score.

4. The image data restoration apparatus according to claim 1, further comprising:
a memory which stores a restoration model that associates the acquired observation data with the restored image data, and a prior knowledge model that indicates prior knowledge about the restored image data.

5. The image data restoration apparatus according to claim 1, wherein
the processing circuitry is further configured to:
determine whether the iterative computation satisfies a predetermined condition.

6. The image data restoration apparatus according to claim 5, wherein the predetermined condition is that an evaluation function for the first intermediate image data exceeds a threshold value.

7. The image data restoration apparatus according to claim 5, wherein the predetermined condition is that an iteration count of the iterative computation reaches a predetermined upper limit value.

8. The image data restoration apparatus according to claim 3, wherein
the processing circuitry is further configured to:
scale the data fitting score in accordance with the number of the selected channels and the number of the plurality of channels corresponding to the acquired observation data.

9. The image data restoration apparatus according to claim 3, wherein
the processing circuitry is further configured to:
scale the data fitting score in accordance with a ratio between a norm of observation data corresponding to the selected channels and a norm of the acquired observation data.

10. The image data restoration apparatus according to claim 1, wherein
the processing circuitry is further configured to:
convert the plurality of channels corresponding to the acquired observation data into a plurality of virtual channels by applying an orthogonal transformation, and
select a virtual channel corresponding to the observation data used in the computation, based on eigenvalues of the observation data corresponding to the plurality of virtual channels.

11. The image data restoration apparatus according to claim 1, wherein
the computation includes a first computation to optimize the restored image data, and a second computation to optimize internal data, and
the processing circuitry is further configured to:
iteratively execute the computation by alternately executing the first computation and the second computation.

12. The image data restoration apparatus according to claim 3, wherein
the plurality of channels correspond to observation data observed for respective coils in an MRI apparatus, and
the data fitting score includes a term that evaluates an L2-norm or a Frobenius norm of a difference between the observation data and data obtained by applying the restoration model to the restored image data.

13. The image data restoration apparatus according to claim 3, wherein
the plurality of channels correspond to observation data observed for respective spectra in a multispectral camera or a spectral X-ray apparatus, and
the data fitting score includes a term that evaluates an L2-norm of a difference between the observation data and data obtained by applying the restoration model to the restored image data.

14. The image data restoration apparatus according to claim 3, wherein
the processing circuitry is further configured to:
obtain time-series observation data observed with respect to the target across multiple times, and
the prior knowledge fitting score includes a term that evaluates an L1-norm of a difference between the restored image data at a first time and the restored image data at a second time different from the first time.

15. An image data restoration method, comprising:
acquiring, with respect to a target, a plurality of items of observation data respectively corresponding to a plurality of channels used in a computation;
selecting a first channel subset and a second channel subset, the first channel subset including one or more channels of the plurality of channels, the second channel subset including, of the plurality of channels, channels larger in number than the first channel subset; and
iteratively executing a computation to optimize a fitting score between first observation data corresponding to the first channel subset and first intermediate image data based on the first observation data, and executing, after the iterative computation satisfies a predetermined condition, a computation to optimize a fitting score between second observation data corresponding to the second channel subset and second intermediate image data based on the second observation data to generate restored image data and outputting the restored image data.

* * * * *